US010240640B2

United States Patent
Halliburton

(10) Patent No.: US 10,240,640 B2
(45) Date of Patent: Mar. 26, 2019

(54) SHAFT-EXPANDING FRUSTOCONICAL LOCK

(71) Applicant: Bionic Power Inc., Vancouver (CA)

(72) Inventor: Charles David Halliburton, Port Moody (CA)

(73) Assignee: Bionic Power Inc., Vancouver (CA)

( * ) Notice: Subject to any disclaimer, the term of this patent is extended or adjusted under 35 U.S.C. 154(b) by 0 days.

(21) Appl. No.: 15/944,208

(22) Filed: Apr. 3, 2018

(65) Prior Publication Data

US 2018/0298952 A1  Oct. 18, 2018

Related U.S. Application Data

(63) Continuation of application No. 15/487,075, filed on Apr. 13, 2017, now Pat. No. 9,945,427.

(51) Int. Cl.
*F16D 1/09* (2006.01)
*F16D 1/097* (2006.01)

(52) U.S. Cl.
CPC ............. *F16D 1/09* (2013.01); *F16D 1/097* (2013.01); *Y10T 403/7069* (2015.01)

(58) Field of Classification Search
CPC . F16B 7/025; F16D 1/09; F16D 1/092; F16D 1/097; Y10T 403/11; Y10T 403/32885; Y10T 403/4924; Y10T 403/4949; Y10T 403/4966; Y10T 403/7026–403/7035; Y10T 403/7069
USPC ..... 403/2, 153, 277, 280, 282, 359.1–359.6, 403/374.4
See application file for complete search history.

(56) References Cited

U.S. PATENT DOCUMENTS

| 1,496,319 | A | 6/1924 | Macdonald |
| 3,776,651 | A | 12/1973 | Peter et al. |
| 3,957,381 | A | 5/1976 | Schafer |
| 4,134,700 | A | 1/1979 | Nelson et al. |
| 4,202,644 | A | 5/1980 | Soussloff |
| 4,345,851 | A | 8/1982 | Soussloff |
| 4,543,704 | A | 10/1985 | Soussloff |
| 4,600,334 | A | 7/1986 | Soussloff |
| 4,615,640 | A | 10/1986 | Hosokawa |

(Continued)

FOREIGN PATENT DOCUMENTS

| DE | 2732048 A1 * | 1/1978 | ............. F16B 7/025 |
| DE | 19913693 | 9/2000 | |

(Continued)

OTHER PUBLICATIONS

Specification Translation of FR 2894001. Chiozzy, Philippe. Driving unit e.g. driving pulley, assembling device for e.g. alternator of motor vehicle, has insertion unit screwed in tubular end of shaft, where end is radially expanded by unit and has radial axial notch extending on shaft's groove. (Year: 2007).*

(Continued)

*Primary Examiner* — Josh Skroupa
(74) *Attorney, Agent, or Firm* — Damien G. Loveland

(57) ABSTRACT

A cone piece is tightened into a compatibly shaped hole in the end of a shaft. As the cone piece is tightened, it forces the shaft to expand outwards. As the shaft expands, it creates or increases pressure against a hub, wheel, crank or other mating piece that is positioned on the shaft, locking it into place.

17 Claims, 2 Drawing Sheets

(56) References Cited

U.S. PATENT DOCUMENTS

| | | | |
|---|---|---|---|
| 4,815,360 A * | 3/1989 | Winterle | F16J 1/12 403/374.4 |
| 5,009,539 A | 4/1991 | Muellenberg | |
| 5,374,135 A | 12/1994 | Folsom et al. | |
| 5,474,403 A | 12/1995 | Hetrich | |
| 5,538,356 A | 7/1996 | Aarre et al. | |
| 5,695,297 A | 12/1997 | Geib | |
| 6,361,243 B1 | 3/2002 | Geib | |
| 8,341,889 B2 | 1/2013 | Faulkner et al. | |
| 8,657,317 B2 | 2/2014 | Syu | |
| 8,943,864 B2 | 2/2015 | Rasmussen et al. | |
| 9,227,464 B2 * | 1/2016 | Payne | B62D 49/00 |
| 9,328,749 B2 | 5/2016 | Brunneke | |
| 9,618,051 B2 * | 4/2017 | Heston | F16D 1/094 |
| 2011/0182660 A1 | 7/2011 | Kemmler et al. | |
| 2011/0198185 A1 | 8/2011 | Lannutti et al. | |
| 2014/0369746 A1 * | 12/2014 | Heston | F16D 1/076 403/374.4 |

FOREIGN PATENT DOCUMENTS

| | | | | |
|---|---|---|---|---|
| DE | 102013224191 A1 * | 5/2015 | | F16D 1/087 |
| FR | 2063479 A5 * | 7/1971 | | B62D 5/06 |
| FR | 2894001 | 6/2007 | | |
| GB | 190925647 A * | 6/1910 | | F16D 1/092 |
| GB | 1062610 | 3/1967 | | |
| GB | 1128021 | 9/1968 | | |
| GB | 2184050 | 6/1987 | | |
| SU | 914832 A1 * | 3/1982 | | F16D 1/09 |

OTHER PUBLICATIONS

Patent Cooperation Treaty International Search Report dated Jul. 11, 2018 issued for the co-pending application assigned International Application No. PCT/CA2018/050432 with an International Filing Date of Apr. 6, 2018

Patent Cooperation Treaty Written Opinon dated Jul. 11, 2018 issued for the co-pending application assigned International Application No. PCT/CA2018/050432 with an International Filing Date of Apr. 6, 2018.

Patent Cooperation Treaty Written Opinion dated Jul. 11, 2018 issued for the co-pending application assigned International Application No. PCT/CA2018/050432 with an International Filing Date of Apr. 6, 2018.

* cited by examiner

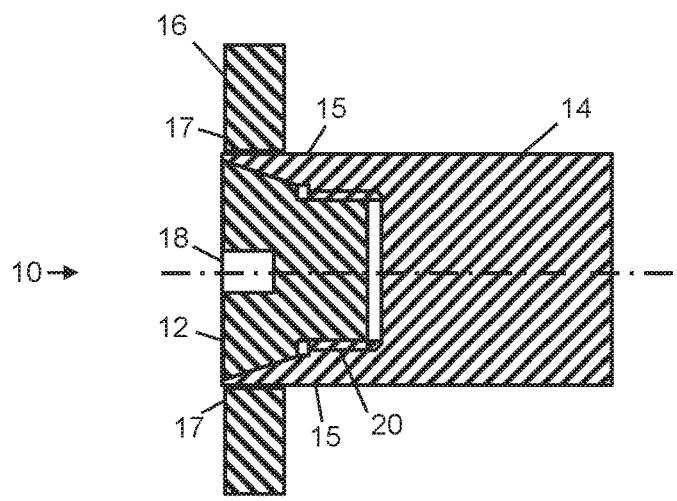
FIG. 1
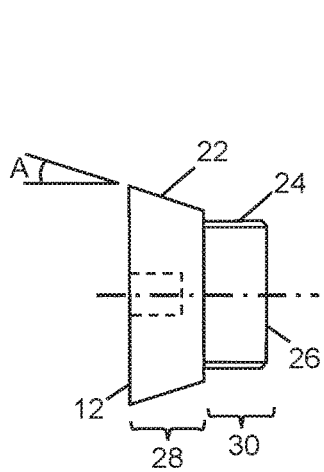
FIG. 2
FIG. 3
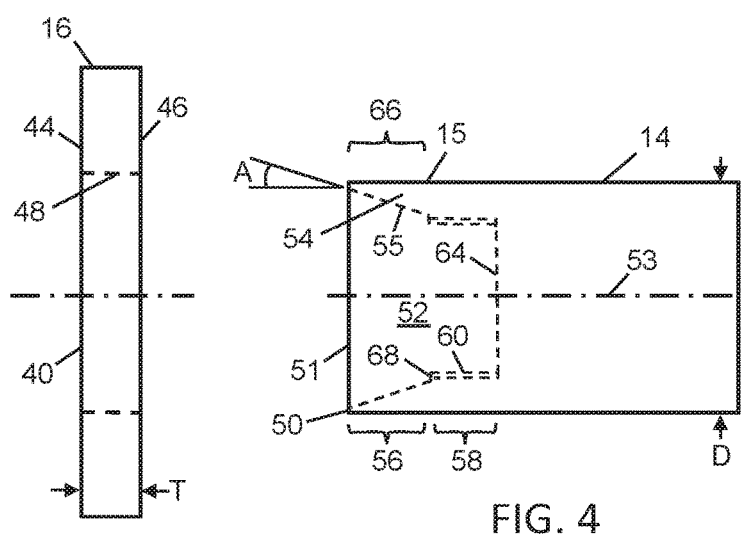
FIG. 4

SHAFT-EXPANDING FRUSTOCONICAL LOCK

CROSS-REFERENCE TO RELATED APPLICATIONS

This application is a continuation of and claims the benefit of U.S. patent application Ser. No. 15/487,075, filed Apr. 13, 2017.

TECHNICAL FIELD

This application relates to a lock for connecting a shaft to a hub, wheel, crank or other mating piece such that torque can be transmitted between the two. In particular, this application relates to a lock having a frustoconical component that is inserted into the shaft.

BACKGROUND

U.S. Pat. No. 3,957,381 to Schafer discloses a coaxial, double-cone, frictional hub-to-shaft connector. The connector includes two clamping rings. The inner surface of the outer ring and the outer surface of the inner ring are conical surfaces, which engage with each other. Tightening screws to the side of the shaft tighten the connector by drawing the rings together in axial direction. As the rings are drawn together, the inner ring clamps against the shaft and the outer ring against an inner surface of the hub.

Splines are ridges or teeth on a shaft that mesh with grooves in a hub or gear wheel, for example, that is located on the shaft. Spline connections allow torque to be transferred between the shaft and the mating piece. Some spline connections are prone to backlash. An alternative to splines is a keyway and key, which, however, may not be as durable.

Cranks having a split-ring connecting portion can be tightened around a shaft. The connection may or may not have splines. The connection can be tightened using a screw located to the side of the shaft.

A tight press fit can be used to connect a solid shaft to a mating piece. This requires tight control of tolerances and typically a large force to press the two components together.

Other methods of joining a shaft to a mating piece include the use of thermal expansion and contraction. For example, a shaft is cryogenically cooled to slip-fit into an interference hole in a wheel hub. As the shaft warms, it expands and forms a strong friction joint with the hub. These joints are difficult to separate.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a lock for connecting a shaft to a hub, wheel, crank, gear or other mating piece such that torque can be transmitted between the two. The lock includes a frustoconical component that is tightened in an axial direction directly into the end of the shaft, forcing the shaft to expand outwards against the mating piece.

The lock does not introduce backlash into the connection, and may have a smaller width, diameter and weight compared to some other types of connection. In some embodiments it has the ability to support and transmit torques from overhung loads and the ability to support axial forces.

Disclosed herein is a shaft-expanding cone lock comprising a cone piece having a first frustoconical surface; and a shaft having: an end face defining an opening of a hole in the shaft; a wall around said hole; a second frustoconical surface that defines an inner surface of the wall, the second frustoconical surface configured to engage with the first frustoconical surface; and a first thread configured to enable tightening of the cone piece into the hole; wherein the wall expands when the cone piece is tightened into the hole.

In some embodiments, the cone piece comprises a second thread configured to engage with the first thread. In some embodiments, the cone piece and the shaft are made from dissimilar materials. In some embodiments, a further hole passes axially through the cone piece. In some embodiments, the shaft defines an additional threaded axial hole having a diameter less than a diameter of said further hole and accessible through said further hole.

In some embodiments, the shaft-expanding cone lock further comprises a mating piece defining a second hole that is dimensioned to receive the shaft at a longitudinal position of the shaft corresponding to the second frustoconical surface. In some embodiments, the mating piece and shaft are made from similar materials. In some embodiments, the cone piece is dimensioned to sustain damage before the mating piece when the cone piece is over-tightened.

BRIEF DESCRIPTION OF DRAWINGS

The following drawings illustrate embodiments of the invention, which should not be construed as restricting the scope of the invention in any way.

FIG. 1 is a cross-sectional view of a shaft-expanding cone lock according to one embodiment of the present invention.

FIG. 2 is a side view of the cone piece of FIG. 1.

FIG. 3 is a side view of the mating piece of FIG. 1.

FIG. 4 is a side view of the shaft of FIG. 1.

DESCRIPTION

A. Glossary

Figure 5:
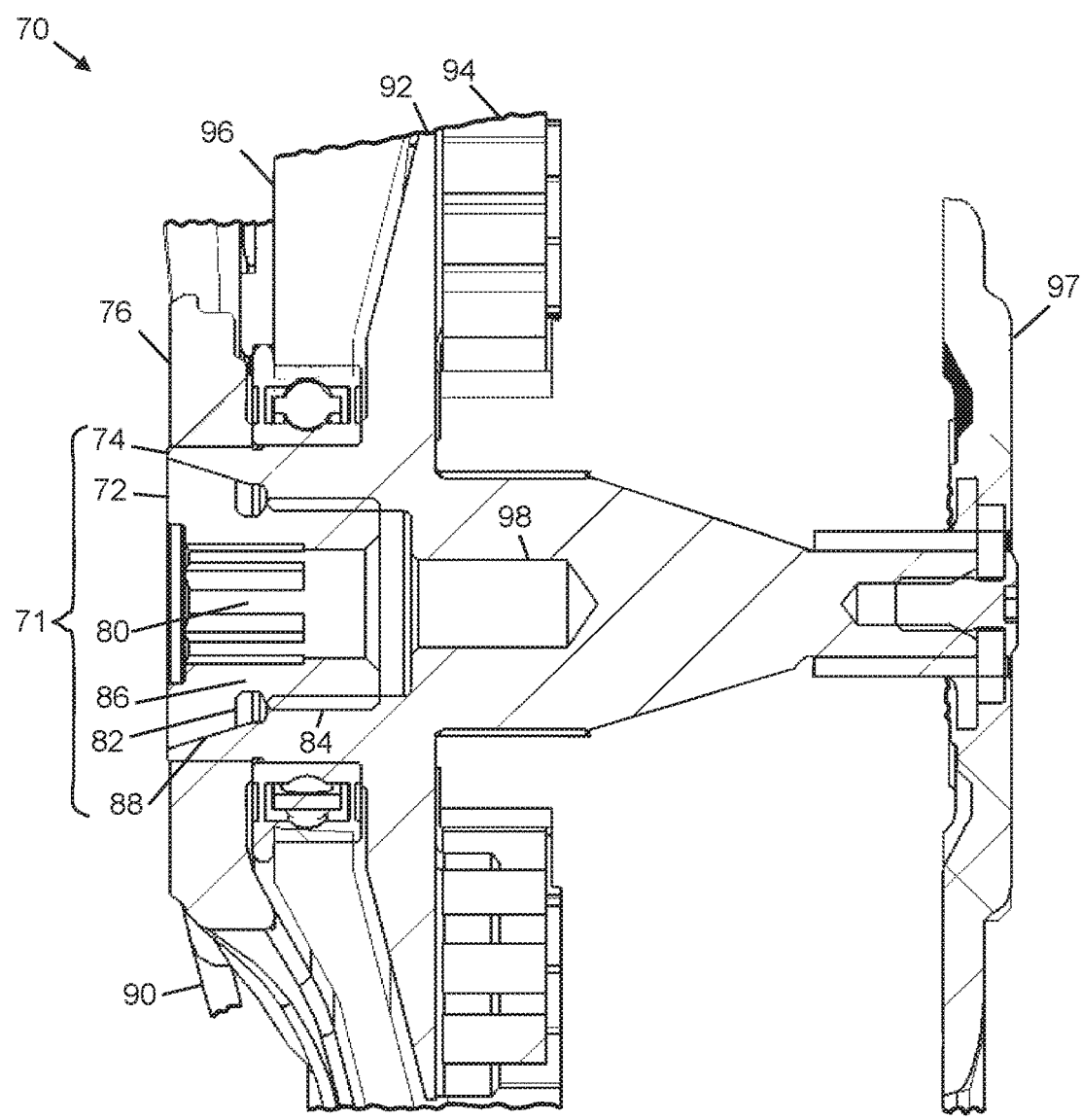
FIG. 5 is an example of a shaft-expanding cone lock according to another embodiment of the present invention, incorporated into a biomechanical energy harvester.

The term "mating piece" refers to a crank, a hub, a wheel, a gear or any other mechanical component that is to be attached to a shaft, such that torque can be transferred either from the shaft to the mating piece or from the mating piece to the shaft.

The term "cone piece" refers to the component of the shaft-expanding cone lock that is inserted and tightened into the end of a shaft. The cone piece has at least one frustoconical portion, which engages with a corresponding frustoconical surface inside the end of the shaft.

The term "frustoconical" relates to the shape of a conical frustum, i.e. a cone with its apex removed such that the cut surface is parallel to the base of the cone.

The term "semi-angle" refers to the angle between the axis of a cone and a generatrix of the cone, the generatrix being a straight line from the cone's apex to the outer edge of the cone's base.

B. Industrial Applicability

The shaft-expanding cone lock is useful for connecting a shaft to a mating piece, such that it can readily be removed if desired. It is particularly useful for connecting mating pieces to shafts in situations where space is limited, for example when the mating piece is too narrow to support a viable thread, or when the space available to either side of the mating piece is too restricted.

C. Exemplary Embodiment

Referring to FIG. 1, an exemplary embodiment is shown of a shaft-expanding cone lock 10, hereinafter referred to as a "lock" for brevity. The lock 10 includes a cone piece 12 and a shaft 14. The lock 10 may alternately be considered to include the cone piece 12 and only the end portion 15 of the shaft. The cone piece 12 and shaft 14 are coaxial. In some embodiments the lock 10 may further include a mating piece 16 or inner portion 17 of the mating piece. The mating piece 16 is received on the shaft at a longitudinal position on the shaft that corresponds to the location of the inner, frustoconical surface of the shaft. The mating piece 16 has a hole that is coaxial with the cone piece 12 and shaft 14.

The cone piece 12 has a socket 18 for receiving the head of a corresponding driving tool. The cone piece 12 is screwed into the end portion 15 of the shaft 14 to form a threaded connection 20, and the cone piece is tightened by rotating it with the driving tool. As the cone piece 12 is tightened into the shaft 14, the shaft expands outwards in the region of the frustoconical portion of the shaft wall, which also corresponds to the region of the corresponding frustoconical portion of the cone piece. As the shaft 14 expands outwards, it presses against the wall of the hole in the mating piece 16, which resists the outward expansion of the shaft. The resulting build-up of pressure between the shaft 14 and the mating piece 16 leads to a strong friction fit between the shaft and mating piece, effectively locking them both together. The resulting friction fit allows the transfer of torque from the shaft 14 to the mating piece 16 and vice versa.

Referring to FIG. 2, the cone piece 12 is shown, with frustoconical surface 22, thread 24 and inner face 26. The frustoconical surface 22 is located in the frustoconical portion 28 of the cone piece 12, which is considered as the outer portion of the cone piece. The outer portion of the cone piece 12 is defined as the portion that faces outwards when the cone piece is inserted into the shaft 14. The thread 24 is located in the inner portion 30 of the cone piece 12, the inner portion being dimensioned to screw into and form the threaded connection 20 with the shaft 14. In this particular example, an M8×1.25 thread was used, although other threads are possible.

The angle A represents the angle between the frustoconical surface 22 and the axis of the cone piece 12 as viewed from the side, i.e. A is the semi-angle of the corresponding cone. In this example, angle A is 18°, although other angles are possible.

Referring to FIG. 3, the mating piece 16 is shown. The mating piece 16 has a cylindrical hole 40 passing through it from outer face 44 to inner face 46. The wall 48 of the cylindrical hole 40 is dimensioned to receive the shaft 14. Depending on the embodiment, the diameter of wall 48 is dimensioned so that the mating piece 16 is either a slip fit over the shaft 14 or a press fit over the shaft 14. It is not required for the press fit to be a tight press fit. If the fit is a press fit, then as the shaft expands outwards, it presses further against the wall 48 of the hole 40 in the mating piece 16. The resulting build-up of additional pressure between the shaft 14 and the mating piece 16 increases the strength of the pressure fit between the shaft and mating piece. The mating piece has a thickness T, which in the present, exemplary embodiment is 3 mm. Other values are of course possible in other embodiments.

Referring to FIG. 4, the shaft 14 is shown with diameter D. The outer or end face 50 of the shaft 14 has an opening 51 of a hole 52 in the end portion 15 of the shaft. The hole 52 is for receiving and engaging with the cone piece 12. The hole 52 is coaxial with the axis 53 of the shaft. The hole 52 is surrounded by a side wall 54 that includes a frustoconical surface 55 that corresponds to the frustoconical surface 22 of the cone piece 12. Angle A of the frustoconical surface 55 is the same angle as that of the frustoconical surface 22 of the cone piece 12. The frustoconical surface 55 is located in the outer portion 56 of the hole 52. In particular, the frustoconical surface 22 of the cone piece 12 presses against the corresponding frustoconical surface 55 of the shaft 14 as the cone piece is tightened into the shaft. The inner portion 58 of the hole 52, is tapped with a thread 60 that corresponds to the thread 24 on the inner portion 30 of the cone piece 12.

The inner face 64 of the hole 52 is located such that there is a gap between the inner face of the hole and the inner face 26 of the cone piece 12 when the cone piece is inserted and tightened into the hole. This is to ensure that the cone piece 12 does not bottom out in the hole 52 before the frustoconical surface 22 of the cone piece engages with the frustoconical surface 55 of the hole. This permits the cone piece 12 to be tightened sufficiently to expand the region 66 of the side wall 54 in the end portion 15 of the shaft 14, locking the shaft to the mating piece 16. Likewise, the step 68 (if present, depending on the embodiment) between the frustoconical surface 55 and the thread 60 is dimensioned so as to allow the cone piece 12 to be tightened sufficiently onto the frustoconical surface 55 before the inward travel of the cone piece is blocked by the step 66.

Region 66 of the side wall 54 of the shaft 14, around the outer portion 56 of the hole 52, can be made relatively thin and with a corresponding reduction in weight compared to other connecting techniques in which the shaft needs to be solid in order to support the clamping forces.

The cone piece 12, shaft 14 and mating piece 16 may be made from materials such as aluminum, steel, titanium or plastic, for example, or any other engineering material. A low coefficient of friction is preferable between the cone piece 12 and the shaft 14 so that the cone piece does not bind while it is being torqued. In some embodiments it can therefore be advantageous to use different materials for the cone piece 12 and the shaft 14 because of the tendency of components of the same material to stick together or bind, although this is not a hard and fast rule. For example, the cone piece 12 could be made from hardened steel and the shaft 14 from titanium. Reduced friction between the cone piece 12 and the shaft 14 means that, for a given cone-tightening torque, a greater axial force is generated, resulting in more expansion of region 66 of the shaft wall 54 around the frustoconical portion 28 of the cone piece. One exception is that the cone piece 12 and shaft 14 could both be made from hardened steel because there would be a low coefficient of friction between the two, although it would be more difficult to use this material.

A high coefficient of friction is preferred between the shaft 14 and the mating piece 16. Both the shaft 14 and the mating piece 16 can be made from titanium as the coefficient of friction between components both made from titanium is high. In other embodiments, it is not necessary that both the shaft 14 and the mating piece 16 are made from the same material. In some embodiments, what normally would be considered a poor surface finish is allowable for the shaft 14 and mating piece 16 interface, because the poor surface finish would provide more friction than a polished surface. Also, the intended "poor" surface finish leads to a lower cost of manufacture.

Furthermore, the frustoconical interface between the cone-piece 12 and the shaft 14 may be lubricated in order to increase the joint capacity. A lapping compound may optionally be used between the shaft 14 and the mating piece 16 to increase friction. Alternately, a thin layer of anti-size lubricant may be used at the interface between the shaft 14 and mating piece 16. However, a dry interface between the shaft 14 and the mating piece 16 provides improved performance of the lock.

Referring to FIG. 5, portions of a bio-mechanical energy harvester 70 employing an exemplary embodiment of the lock 71 are shown. The harvester 70 is used to generate electrical energy from flexing and extending motion of a knee joint, and optionally to provide power to the knee joint to assist in locomotion. The cone piece 72 is shown inserted into the shaft 74 and a crank 76 is shown locked onto the shaft by the tightening of the cone piece into the end of the shaft. The lock 71 allows all intended loads of the harvester to be transferred between the shaft 74 and the crank 76.

The cone piece 72 includes a hex drive socket 80 for receiving the head of a driving tool. Undercut 82 provides a gap or relief for the thread cutting tool that cuts the thread 84 on the cone piece 72. If desired, cross-sectional area 86 of the cone piece 72, between the undercut 82 and the socket 80 can be dimensioned so that the frustoconical portion 88 of the cone piece breaks off if the cone piece is over-tightened.

The crank 76 is connected to a link 90 that operates the crank, or that is operated by the crank. The shaft 74 has a flange 92, which drives a set of gears 94, or which is driven by the set of gears. The shaft 74 is mounted in a housing having sides 96, 97 so that it can rotate. In this embodiment, a further, threaded hole 98 is drilled in the shaft 74. The threaded hole 98 has a diameter less than the diameter of the hole 80 for the socket in the cone piece 72. Access to the threaded hole 98 is via the hole 80 for the socket, the hole used for the socket in this embodiment passing axially through the cone piece. The threaded hole 98 may be used to secure a fastener that prevents the cone piece 72 from loosening, or for further locking down the cone piece. The hole 98 may also be used to secure other components, such as a condyle pad for cushioning the side of the knee.

It can be seen from the example of the harvester 70, which has a compact configuration, that there is little available space for connecting the crank 76 to the shaft 74. Nevertheless, the lock 71 successfully secures the crank 76 to the shaft.

D. Variations

Smaller values of angle A mean that less axial force is required between the cone piece 12 and shaft 14, and less tightening torque is required than for larger values of angle A. It is expected that angles close to 18° would work in a substantially similar fashion, such as 16°, 17°, 19° and 20° or within that range. Modeling carried out on locks 10 with other angles A using finite element analysis has indicated that angles in the range between 10° and 30° would also work satisfactorily. Values for angle A outside this range would also work, but with lower effectiveness. Depending on the embodiment, an angle from above 0° to about 45° would work. However, if A>30°, then the required tightening torque may be excessive. If A<10°, then there may a risk of bursting the mating piece 16. A further disadvantage of using smaller angles compared to using larger ones is that greater axial travel of the cone piece 12 is required, which necessitates the use of longer parts. Depending on the dimensions of the application, the room required for the longer parts may not always be available.

The angle A can be selected so that, if the cone piece is over-tightened in the shaft 14, the frustoconical portion 28 of the cone piece 12 breaks off from the inner portion 30 of the cone piece before the mating piece 16 bursts. In at least one specific example, this is achieved when the shaft 14 and mating piece 16 are titanium, the cone piece 12 is hardened steel, the mating piece has a thickness T of 3 mm, the shaft 14 has a diameter D of 11 mm, the threaded connection 20 is M8×1.25 and angle A is 18°. Other factors also need to be taken into consideration such as the amount and type of lubrication between the frustoconical surfaces 22, 55 of respectively the cone piece 12 and the shaft 14.

Other features may be incorporated into the cone piece 12 to ensure that the outer portion 28 breaks off if the cone piece is over-tightened. For example, there may be an undercut (82, FIG. 4) below the inner end of the outer portion 28 and/or there may be an axial hole drilled all the way through the cone piece 12. Both of these result in a reduced cross-sectional area of material in the inner portion of the cone piece 12, which allows the outer portion 28 to break away more easily.

For applications where the space is restricted, a fine pitch would be better than a course pitch for the threaded joint 20, because it would allow for shorter parts and a fine pitch is a little stronger and provides a little more axial force per unit of torque.

Other means may be used to fasten the cone piece 12 into the shaft 14, such as a screw that is separate from the cone piece and passes through it to tighten onto the thread 60 in the shaft. In this case, the cone piece would just consist of the outer portion 28, and would not include the inner portion 30. In other embodiments, a spring could be used to load the cone piece 12.

In normal use, materials, dimensions and threads should be selected so that the elastic limits of the materials used are not exceeded.

In some embodiments, an extra fastener may be included to prevent the cone piece 12 from becoming unscrewed. It would also be advantageous for the additional fastener to have a different thread pitch from that of the cone piece 12, although this is not absolutely necessary.

The mating piece 16 may be locked onto the shaft 14 so that it is flush with the end face 50 of the shaft. However, in other embodiments the mating piece 16 may be locked onto the shaft 14 either in an overhanging position or beyond flush.

The thickness T of the mating piece 16 may be equal to, greater than or narrower than the axial extent of the frustoconical portion 28 of the cone piece 12.

The cone piece 12 may be of unitary construction, or it may be made from multiple constituent components. The mating piece 16 may be of unitary construction, or it may be made from multiple constituent components.

Figure 6:
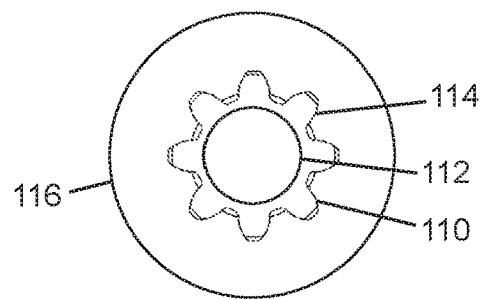
FIG. 6 is an alternate embodiment in which the connection between the shaft and the mating piece is also splined.

Another embodiment is shown in FIG. 6 that includes splines 110 on the shaft 114. The cone piece 112 is used to expand the splined shaft 114 to remove any backlash that may be present between the shaft 114 and the mating piece 116. The splines 110 are involute, and may have another form in other embodiments.

Although the present invention has been illustrated in relation to use in a bio-mechanical energy harvester, it has wide application in respect of other areas, such as in the bicycle industry. In particular, due to the desire to make bicycles lighter, smaller and lighter components are being used. The lock of the present invention, due to its narrower construction compared to other techniques for joining a crank to a shaft, is useful for bicycles in which the crank assembly is to be made narrower.

It will be clear to one having skill in the art that further variations to the specific details disclosed herein can be made, resulting in other embodiments that are within the scope of the invention disclosed. Parameters are given to the nearest decimal place, such that a value written as 16, for example, implies any value in the range of 16±0.5. All parameters, dimensions, materials, proportions and configurations described herein are examples only and actual values of such depend on the specific embodiment. Accordingly, the scope of the invention is to be construed in accordance with the substance defined by the following claims.

The invention claimed is:

1. A shaft-expanding cone lock comprising:
a cone piece having an unthreaded and unslotted first frustoconical surface; and
a shaft having:
an end face defining an opening of a hole in the shaft;
a wall around said hole;
a second frustoconical surface that defines an inner surface of the wall, the second frustoconical surface configured to engage with the first frustoconical surface;
a first thread located inwardly from the second frustoconical surface and configured to enable tightening of the cone piece into the hole;
wherein the wall expands when the cone piece is tightened into the hole;
wherein the cone piece defines a further hole passing axially through the cone piece; and
wherein the shaft defines an additional threaded axial hole having a diameter less than a diameter of said further hole and accessible through said further hole.

2. The shaft-expanding cone lock of claim 1, wherein the cone piece comprises a second thread configured to engage with the first thread.

3. The shaft-expanding cone lock of claim 1, wherein the wall expands in a region around the second frustoconical surface.

4. The shaft-expanding cone lock of claim 1, wherein the cone piece defines a socket configured to accept a head of a driving tool.

5. The shaft-expanding cone lock of claim 1, wherein the cone piece and the shaft are made from dissimilar materials.

6. The shaft-expanding cone lock of claim 1, wherein the first and second frustoconical surfaces and the shaft are coaxial.

7. The shaft-expanding cone lock of claim 1, wherein the first and second frustoconical surfaces have semi-angles between 10° and 30°.

8. The shaft-expanding cone lock of claim 7, wherein the semi-angles measure between 16° and 20°.

9. A shaft-expanding cone lock comprising:
a cone piece having an unthreaded and unslotted first frustoconical surface;
a shaft having:
an end face defining an opening of a hole in the shaft;
a wall around said hole;
a second frustoconical surface that defines an inner surface of the wall, the second frustoconical surface configured to engage with the first frustoconical surface; and
a first thread located inwardly from the second frustoconical surface and configured to enable tightening of the cone piece into the hole; and
a mating piece defining a second hole that is dimensioned to receive the shaft at a longitudinal position of the shaft corresponding to the second frustoconical surface;
wherein the wall expands when the cone piece is tightened into the hole;
wherein the cone piece is dimensioned to sustain damage before the mating piece when the cone piece is over-tightened.

10. The shaft-expanding cone lock of claim 9, wherein the mating piece is a crank.

11. The shaft-expanding cone lock of claim 9, wherein the second hole is dimensioned to receive the shaft with a slip fit.

12. The shaft-expanding cone lock of claim 11, wherein the wall expands to create pressure on an inner surface of the second hole.

13. The shaft-expanding cone lock of claim 9, wherein the second hole is dimensioned to receive the shaft with a press fit.

14. The shaft-expanding cone lock of claim 13, wherein the wall expands to increase pressure of the shaft on an inner surface of the second hole.

15. The shaft-expanding cone lock of claim 9, wherein the mating piece and shaft are made from similar materials.

16. The shaft-expanding cone lock of claim 9, wherein the first and second frustoconical surfaces, the shaft and the second hole are coaxial.

17. The shaft-expanding cone lock of claim 9, wherein the mating piece and the shaft form a splined connection.

* * * * *